Aug. 16, 1932.    J. D. HAY    1,871,452
INJECTION ENGINE
Filed Sept. 30, 1925
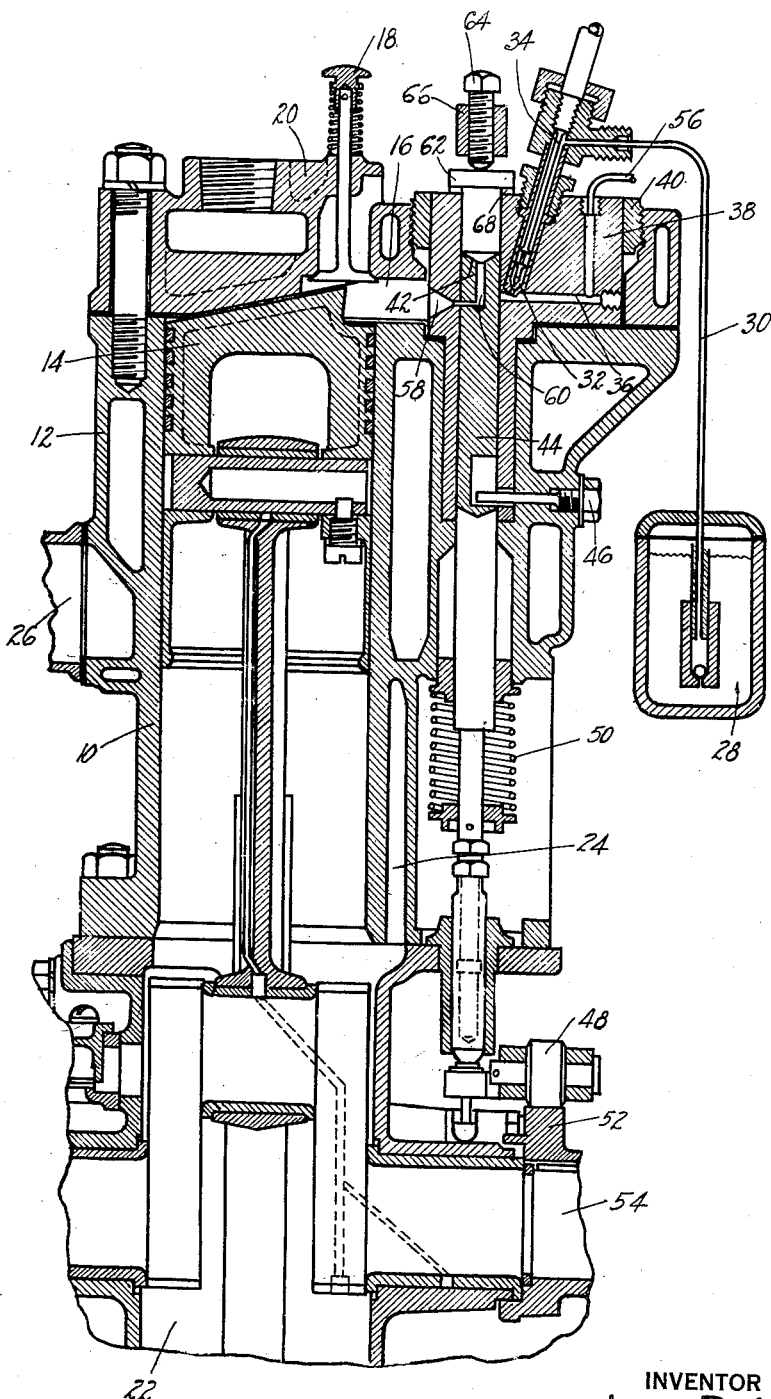
INVENTOR
JOHN D. HAY
BY M. W. McConkey
ATTORNEY Patented Aug. 16, 1932

1,871,452

UNITED STATES PATENT OFFICE

JOHN D. HAY, OF SOUTH BEND, INDIANA, ASSIGNOR, BY MESNE ASSIGNMENTS, TO BENDIX AVIATION CORPORATION, A CORPORATION OF DELAWARE

INJECTION ENGINE

Application filed September 30, 1925. Serial No. 59,596.

This invention relates to injection engines, and its principal object is to inject the fuel in the form of a hot, diluted, carbureted mixture or vapor, instead of as a liquid or spray. Preferably the fuel is vaporized in hot exhaust gas from the engine, which is inert and therefore permits the vapor to be heated far above its temperature of ignition, and also permits it to be injected by being compressed more highly than the air in the engine cylinder.

In one desirable arrangement, the gas is sucked across a fuel passage, taking up a charge of fuel, and is then compressed and injected. In order to secure adequate compression of the fuel charge without an extremely small compression space above the pump piston, I prefer to add a further charge of gas unmixed with fuel, and described as hot exhaust gas from the engine cylinder. This dilutes the fuel mixture, facilitating the vaporization of the fuel and at the same time giving a greater volume to compress, without the disadvantage of the excessively fine metering of the fuel which would be necessary if all the gas crossed the fuel passage in entering the pump cylinder.

The new method of operation is especially well adapted for small high-speed engines, in which the preparation of the fuel is extremely important, the operation of such engines on the "solid-injection" Diesel principle, or with liquid fuel injected as a spray, having proved impossible up to the present time. Moreover, ordinary fuel-preparation methods are inadequate, owing to the extreme rapidity with which the engine cycle is gone through,—there being only a minute fraction of a second available for heating each charge. As the heat in the exhaust-gas part of the charge, and the heat added by compression, are substantially independent of the engine speed, complete vaporization of the fuel at all speeds is insured, the temperature of the fuel charges in practice being above the ignition temperature at the time of injection, so that complete combustion in the engine is insured.

These and other objects and features of the invention, including various novel combinations of parts and desirable particular constructions, will be apparent from the following description of one illustrative embodiment shown in the accompanying drawing, in which:

The figure is a section axially of the engine cylinder through the entire engine.

While the invention is applicable to various types of engines, I have illustrated a two cycle engine including a cylinder 10, which may be provided with a water jacket 12, and a piston 14, the cylinder and piston being arranged to provide a suitable combustion chamber 16. A relief valve 18 may be provided in the cylinder head 20, for use in starting. The air charge is compressed in the crank case 22, and flows through a passage 24 to the intake port, not shown, which is uncovered when piston 14 is at the bottom of its stroke, at which time there is also open an exhaust port (not shown) communicating with an exhaust conduit 26. Except as further described below, these parts or their equivalents may be of any desired construction.

Fuel is supplied from any suitable source 28, through a conduit 30 to a passage or nozzle 32 controlled by a manually-adjustable needle valve 34. Nozzle 32 opens into a passage 36 in a fuel-valve assembly block 38 held by a clamp ring 40 threaded in the cylinder head 20. Block 38 is formed with a pump cylinder 42 having a pump piston 44, and passage 36 opens into the cylinder a short distance above the position of the piston at the lower end of its stroke. Piston 44 is held from turning by a key 46, and has a cam roller 48 held by a spring 50 against a cam 52 on the crankshaft 54. If desired, the fuel in source 28 may be under pressure. I prefer, however, to provide a suitable check valve in the end of conduit 30, the fuel being under atmospheric pressure only, so that conduit 30 and valve passage 34 are constantly filled with fuel by the suction from piston 44 which thus acts as a fuel-feeding pump for the liquid fuel as well as for the vaporized fuel mixture.

On its downward or suction stroke, passage 36 is closed until the piston approaches the bottom of its stroke, thus building up a substantial vacuum in the pump cylinder 42. When passage 36 is opened, a sudden current of gas rushes through it, across the fuel passage 32, taking up a charge of fuel and partly filling the pump cylinder 42. I prefer that this gas be hot exhaust gas from the engine, brought to passage 36 through a conduit 56 either from the exhaust conduit 26 or direct from the engine cylinder, in which at that time piston 14 is approaching the end of its power stroke.

Immediately after opening passage 36, and substantially at the bottom of its stroke, pump piston 44 uncovers a passage 58 opening through the wall of block 38 directly into the combustion chamber 16. This takes place before piston 14 uncovers its exhaust and air-intake ports, or so soon thereafter that there is a substantial pressure in the engine cylinder, and consequently hot exhaust gases from the engine cylinder fill the pump cylinder 42. Passage 58 is almost immediately shut off, and passage 36 is shut off before the pressure in the pump cylinder builds up enough to cause back pressure on the valve 34 or on the fuel line.

Pump piston 44 now rises, the heat of compression added to the heat already in the exhaust gases completely vaporizing the fuel charge. At the upper end of its stroke, a passage 60 in the pump piston registers with passage 58, and the vaporized mixture of exhaust gas and fuel, at a temperature considerably above the ignition point of the fuel, is injected by virtue of its higher pressure into combustion chamber 16, in which piston 14 has compressed a charge of air, which air has been heated by the compression above the ignition point of the fuel.

The upper end of the pump cylinder 42 is closed by a plug 62 held by a setscrew 64 in a yoke 66, and may be adjusted by shims or gaskets 68 to vary the compression of the fuel charge.

It will be observed that when the engine is first started, on the first cycle the conduit 56 will supply cold air instead of hot exhaust gas to the pump cylinder. However, the compression is so great that the fuel will be ignited on the compression stroke of the pump piston 44, a small part of it burning and aiding the heat of compression in vaporizing the remainder of the fuel. Thus from the very first cycle, fully-vaporized highly-heated fuel charges are injected into the engine cylinder, and there is no need of complicated torches and other auxiliary heaters in starting.

While one particular engine has been described in detail, it is not my intention to limit the scope of the invention by that description, or otherwise than by the terms of the appended claims.

I claim:

1. An engine of the injection type comprising, in combination, an engine cylinder and piston with a combustion chamber above the piston, an adjacent pump cylinder and piston, a passage from the pump cylinder opening into the combustion chamber and uncovered by the pump piston at the end of its suction stroke, an intake passage opening into the pump cylinder above the first passage, and a fuel passage opening into the intake passage in such a manner that gas rushing through the intake passage on the suction stroke of the pump piston will take up fuel from the fuel passage, the pump cylinder and piston being arranged to compress the fuel and the gas from the intake passage and the gas received from the combustion chamber at the end of the suction stroke and inject the compressed mixture into the combustion chamber at the end of the compression stroke of the pump piston.

2. An engine of the injection type comprising, in combination, an engine cylinder and piston with a combustion chamber above the piston, an adjacent pump cylinder and piston, a passage from the pump cylinder opening into the combustion chamber and uncovered by the pump piston at the end of its suction stroke, an intake passage opening into the pump cylinder above the first passage, a fuel passage opening into the intake passage in such a manner that gas rushing through the intake passage on the suction stroke of the pump piston will take up fuel from the fuel passage, and an adjustable valve controlling the fuel passage, the pump cylinder and piston being arranged to compress the fuel and the gas from the intake passage and the gas received from the combustion chamber at the end of the suction stroke and inject the compressed mixture into the combustion chamber at the end of the compression stroke of the pump piston.

3. An engine of the injection type comprising, in combination, an engine cylinder and piston with a combustion chamber above the piston, an adjacent pump cylinder and piston, a passage from the pump cylinder opening into the combustion chamber and uncovered by the pump piston at the end of its suction stroke, an intake passage opening into the pump cylinder above the first passage but being uncovered near the end of the suction stroke of the pump piston, so that a considerable suction will exist in the pump cylinder when the intake passage is uncovered, thus giving a sudden inrush of gas through the intake passage, and a fuel passage opening into the intake passage in such a manner that said sudden inrush of gas will suck fuel from the fuel passage, the pump cylinder immediately thereafter being filled with gases from the combustion chamber as the first passage is uncovered, and the pump piston being arranged to compress the mixed gases and inject them into the combustion chamber.

4. An injection engine having an engine cylinder and piston arranged to compress air unmixed with fuel, and comprising, in combination therewith, a pump cylinder communicating with the engine cylinder through two separate passageways to receive exhaust gases therefrom and to deliver a charge thereinto through one of said passageways, a pump piston operable within the pump cylinder to uncover said passageways successively on its suction stroke to admit exhaust gases through both of them from the engine cylinder, means for delivering fuel into the pump cylinder to mix with the exhaust gases therein, said pump piston adapted to compress said mixture and eject it into the engine cylinder.

In testimony whereof, I have hereunto signed my name.

JOHN D. HAY.